(12) United States Patent  
Sardy et al.

(10) Patent No.: US 8,389,897 B2
(45) Date of Patent: Mar. 5, 2013

(54) WELDING METHOD FOR CARRYING OUT A WELDING PROCESS

(75) Inventors: Bank Sardy, Linz (AT); Gernot Trauner, Buchkirchen (AT)

(73) Assignee: Fronius International GmbH (AT)

( * ) Notice: Subject to any disclaimer, the term of this patent is extended or adjusted under 35 U.S.C. 154(b) by 540 days.

(21) Appl. No.: 12/310,873

(22) PCT Filed: Sep. 3, 2007

(86) PCT No.: PCT/AT2007/000419
§ 371 (c)(1),
(2), (4) Date: Dec. 21, 2009

(87) PCT Pub. No.: WO2008/028209
PCT Pub. Date: Mar. 13, 2008

(65) Prior Publication Data
US 2010/0133250 A1    Jun. 3, 2010

(30) Foreign Application Priority Data

Sep. 8, 2006 (AT) ................................ A 1509/2006

(51) Int. Cl.
*B23K 9/10* (2006.01)
*B23K 33/00* (2006.01)

(52) U.S. Cl. ........... 219/130.1; 219/130.21; 219/130.33; 219/130.5; 219/130.51; 219/136; 219/137 R; 219/137 PS (58) Field of Classification Search ............. 219/130.01, 219/130.1, 130.21, 130.31, 130.32, 130.5, 219/130.51, 136, 137 R, 137 PS, 130.33
See application file for complete search history.

(56) References Cited

U.S. PATENT DOCUMENTS

| | | | | |
|---|---|---|---|---|
| 3,555,239 A | * | 1/1971 | Kerth | 219/130.5 |
| 4,532,404 A | * | 7/1985 | Boillot et al. | 219/130.21 |
| 5,061,841 A | * | 10/1991 | Richardson | 219/130.01 |
| 5,278,390 A | * | 1/1994 | Blankenship | 219/130.5 |

(Continued)

FOREIGN PATENT DOCUMENTS

| CN | 1266391 A | 9/2000 |
|---|---|---|
| CN | 1469791 A | 1/2004 |

(Continued)

OTHER PUBLICATIONS

Zhang. Y.M. et al.: Interval model based control of gas metal arc welding; Proceedings of the 1998 American Control Conference, Band 3. 24.-26. Jun. 1998; pp. 1752 1753.

*Primary Examiner* — Trong Phan
(74) *Attorney, Agent, or Firm* — Lerner, David, Littenberg, Krumholz & Mentlik, LLP (57) ABSTRACT

The invention relates to a welding method for implementing and monitoring a welding process, whereby a power source (2) and a feeding device (10) for the welding rod (11) are controlled by means of a control device (4), and whereby at least one control variable is measured or calculated from characteristic variables of the arc during the welding process. After setting a first and a second time interval (102) with different durations and a scanning rate for determining the values of the characteristic variable (100), the values of the characteristic variable (100) are stored with every scan, after which, at an instant (40), a first mean value (106) and a second mean value (107) are calculated from the stored values of the characteristic variable which lie in time intervals earlier in time than the instant (40) by the control device as the control variable, after which an upper and a lower threshold value (104, 105) is calculated starting from the first mean value (106) of the first time interval (101), and the control variable is then compared with the upper and with the lower threshold value (104, 105).

37 Claims, 7 Drawing Sheets

U.S. PATENT DOCUMENTS

| | | | | |
|---|---|---|---|---|
| 5,508,493 | A | * | 4/1996 | Ueyama et al. ......... 219/130.51 |
| 5,571,431 | A | * | 11/1996 | Lantieri et al. ........... 219/130.01 |
| 5,756,967 | A | | 5/1998 | Quinn et al. |
| 6,096,994 | A | * | 8/2000 | Handa et al. ............... 219/130.5 |
| 6,107,601 | A | * | 8/2000 | Shimogama ............ 219/130.01 |
| 6,315,186 | B1 | * | 11/2001 | Friedl et al. ................ 219/130.1 |
| 6,384,376 | B1 | * | 5/2002 | Plottier et al. ........... 219/130.51 |
| 6,479,793 | B1 | * | 11/2002 | Wittmann et al. ......... 219/130.5 |
| 7,282,667 | B2 | * | 10/2007 | Hsu et al. ................ 219/130.01 |
| 8,124,913 | B2 | * | 2/2012 | Artelsmair ............... 219/130.21 |

FOREIGN PATENT DOCUMENTS

| | | |
|---|---|---|
| DE | 4203190 | 5/1993 |
| EP | 0248654 | 12/1987 |
| JP | 2001162372 | 6/2001 |
| RU | 2120843 C1 | 10/1998 |
| RU | 2219646 C2 | 12/2003 |
| RU | 2220035 C1 | 12/2003 |
| RU | 2275280 C2 | 4/2006 |
| SU | 1704985 | 1/1992 |

* cited by examiner

WELDING METHOD FOR CARRYING OUT A WELDING PROCESS

CROSS REFERENCE TO RELATED APPLICATIONS

The present application is a national phase entry under 35 U.S.C. §371 of International Application No. PCT/AT2007/000419, filed Sep. 3, 2007, which claims the benefit of Austrian Patent Application No. A 1509/2006, filed Sep. 8, 2006. The disclosures of said applications are incorporated by reference herein.

The invention relates to a method of arc welding, as defined in the introductory part of claims 1 and 32.

Various arc welding methods for implementing welding processes using an arc to melt a welding rod are known. In the case of MIG/MAG welding methods, an arc burns between the current-conducting rod electrode and the workpiece under an inert gas, and the machine-fed rod serves as an electrode and melts in its own arc. In other types of arc welding methods using a melting welding rod, a voltage or current curve which is pulsed over a period of time can also be applied by means of the device used to control the welding current ripple. In addition to these pulsed processes, however, other arc welding methods are also known whereby an exactly controlled oscillating movement in the forward and backward direction is superimposed on the forward movement of the rod. Particularly in the case of automated welding systems of this type, which are controlled by a robot for example, high demands are placed on functional reliability. For example, functional errors can occur when feeding the welding rod, which can cause burning back as far as the contact pipe of the welding torch. If such errors are not detected in good time, this can cause considerable damage to the contact pipe and welding torch.

Accordingly, the underlying objective of the invention is to propose a welding apparatus and a welding method for implementing welding processes with a welding rod which melts in an arc, whereby greater functional reliability can be achieved and damage to the welding apparatus caused by errors can be prevented or kept to a minimum.

This objective is achieved by the welding method defined in claim 1. Accordingly, a welding method for implementing and monitoring a welding process is proposed, whereby a first and a second time interval of differing durations and a scanning rate for determining the values of the characteristic variable are set, and the values obtained for the characteristic variable with every scan are stored, after which a first mean value and a second mean value are calculated by the control device as the control variable at a point in time from the values stored for the characteristic variable which lie in the time interval earlier than the point in time, and then an upper and a lower threshold value are calculated from the first mean value of the first time interval and the control variable is compared with the upper and lower threshold value. The advantage of this approach is that the control device is able to intervene in the operation of the welding apparatus and in the welding process on an automated basis. The position of the time intervals can be selected so as to be immediately before the last respective determined value of the characteristic variable, although it is also possible for the time intervals to be positioned at an earlier point in time than the last determined value of the characteristic variable based on a specific time difference. A major advantage of this control method resides in the fact that the threshold values can be selected as closely as possible to the other characteristic variable, thereby resulting in a very small window.

The objective of the invention is also independently achieved by the welding method defined in claim 2. In this instance, a time interval with a duration and scanning rate for determining the values of the characteristic variable is set, and the values of the characteristic variable are stored with every scan, after which, at an instant (40), the control device calculates a mean value from the stored values of the characteristic variable which lie in a time interval earlier than the instant (40), and the last measured value of the characteristic variable is used as the control variable, and an upper and a lower threshold value are then calculated from the mean value of the time interval, after which the control variable is compared with the upper and lower threshold value.

In the likewise independent solution proposed by the invention in claim 3, a first and a second number of values to be stored for the characteristic variable and a scanning rate for determining the values of the characteristic variable are set, the second number being smaller than the first number, and the values of the characteristic variable are stored with every scan, after which, at an instant, the control device calculates a first mean value and a second mean value for the control variable from the values stored for the characteristic variable earlier in time than the instant time, after which an upper and a lower threshold value are calculated from the first mean value of the first number and the control variable is compared with the upper and lower threshold value.

In an alternative embodiment, a welding method for implementing a welding process with a welding rod melting in an arc is proposed, whereby energy is supplied from at least one automatically regulated power source, and the power source and a device for feeding the welding rod are controlled by the welding apparatus. In addition, during the welding process, at least one control variable is measured or calculated from characteristic variables of the arc or welding process, such as welding current, welding voltage or resistance, and values for the control variable are recorded or stored in the control device during the duration of a pre-definable time interval. A mean value for the control variable is then calculated from these values lying in the time interval and from these an upper and/or a lower threshold value is set. These threshold values are based on a difference relative to the mean value of the control variable which amounts to a small fraction of the mean value of the control variable. If the value of the control variable exceeds the upper threshold value or drops below the lower threshold value at any time, a control signal is then generated by the control device. As a function of this control signal, the welding process is then interrupted by the control device or a status report of statuses of the welding process is generated. Such status reports may relate to the feed position of the rod, the status of the welding torch and the workpiece quality, for example. To implement the monitoring aspect of the welding process, the mean value as well as the upper and lower threshold values are continuously recalculated over time in that the time interval lying before the instantaneous value of the control variable in time is recorded. The mean value of the control variable is therefore determined on the basis of those respective values or individual values of the control variable which lie precisely in the time window defined by the time interval.

In another embodiment of the welding method, the control signal is emitted if the upper threshold is exceeded or if there is a drop below the lower threshold over the duration of an observation period which is longer than a predefined control period. Providing such a control period during which the control variable may briefly move out of the range between the lower and upper threshold offers the advantage of greater flexibility in terms of monitoring the welding process with a degree of error tolerance which can be selected accordingly.

In view of the fact that a control signal is emitted by the control device, an alarm can be triggered by the control signal. The advantage of this is that persons responsible for operating the welding system can be provided with information about problems occurring or impending defects in the welding system at an early stage.

As an alternative or additional feature, it may be that the control signal triggers activation of the feeding device in order to change the speed Vd at which the welding rod is fed. Furthermore, the control signal may also activate a cooling device for changing the cooling power for a welding torch of the welding apparatus. The advantage of this is that the control device can automatically intervene to control the welding process, thereby preventing unnecessary interruptions to the welding process. Finally, however, another feature may be provided whereby the control signal triggers an interruption to the welding process. The advantage of this is that it prevents damage to the welding apparatus, in particular at the welding torch or contact pipe of the welding torch due to blockages in the feeding of the welding rod.

With a view to monitoring the welding process, minimum points may also be defined within a periodic voltage curve of the welding voltage U(t). These denote short circuits in the arc of the arc welding process. Based on the number of minimum points which occur during a preselectable time interval based on the instantaneous observation period, a frequency H(t) of short circuits occurring in the arc is calculated and this frequency H(t) is used as a control variable.

In addition, prior to running a welding process, a minimum frequency Hmin is set as a lower threshold and a maximum frequency Hmax is set as an upper threshold for the instantaneous frequency H(t). Using the frequency H(t) as a control variable in this way enables the welding process to be monitored without having to know the absolute values of the welding current and welding voltage.

Alternatively but also in addition, a time sequence of period durations TB may be measured or defined for the welding method from a periodic voltage curve plotting the welding voltage U(t) or a periodic current curve of the welding current I(t), and this sequence of period durations TB is used as a control variable.

Before running a welding process, a minimum period duration TBmin is set as a lower threshold and a maximum period duration TBmax is set as an upper threshold for the sequence of period durations TB. The advantage of this is that only time differences of consecutive short circuits in the arc have to be determined in order to monitor the welding process without it being necessary to take an exact measurement of or obtain an exact knowledge of the current or voltage curve.

In the case of another example of an embodiment of the welding method, an instantaneous resistance R(t) is calculated from the welding voltage U(t) and from the welding current I(t), and this resistance R(t) is then also used as the control variable. The advantage of this is that it is also possible to a monitor welding processes during which a periodic change in current and voltage is fixedly pre-set by the controller of the power source, as is the case with a pulsed welding process for example.

To this end, it may be that, prior to running the welding process, a minimum resistance RAmin which does not change over time is set as a lower threshold and a maximum resistance RAmax which does not change over time is set as an upper threshold for the instantaneous resistance R(t). The advantage of this is that general erroneous states in a welding process or of a welding apparatus can be monitored and ruled out.

For the welding method, another feature is that during the welding process, a minimum resistance Rmin(t) which is variable over time is set as a lower threshold and a maximum resistance Rmax which is variable over time is calculated as an upper threshold for the instantaneous resistance R(t). In order to calculate these upper and lower thresholds, the maximum resistance Rmax(t) is advantageously calculated from the sum of a mean resistance RM(t) and an upper resistance difference EO, and the minimum resistance Rmin is calculated from the difference between the mean resistance RM(t) and a lower resistance difference Reu. In this respect, the mean resistance RM(t) is determined by taking a mean value of the instantaneous resistance R(t) over a time interval TI. The upper and the lower resistance difference Reo, Reu therefore define a tolerance range for the instantaneous resistance R(t), the position of which is likewise variable over time depending on the change in mean resistance RM(t) over time. This enables a relatively narrow tolerance range to be set for the instantaneous resistance R(t) and imparts high flexibility to the welding method and monitoring process because these thresholds do not have to be absolutely fixed.

In this respect, it may also be that when determining the mean value for calculating the mean resistance RM(t), different ranges in the time intervals TI may be taken into account to a greater or lesser degree on the basis of a weighting factor for the instantaneous resistance R(t). This enables different monitoring characteristics to be obtained because resistance values lying farther back from the point of the observation period can be taken into account to a greater or lesser extent when determining the mean value.

In the case of another embodiment of the method, the resistance R(t) may be calculated by determining the mean value over at least one period duration TB of the periodic voltage curve plotting the welding voltage U(t) or the periodic current curve plotting the welding current U(t). The advantage of this is that insignificant or only slightly significant fluctuations in the time curve of the resistance R(t) can be avoided or skipped to a certain degree.

In another approach, the minimum resistance RAmin which does not vary over time and the maximum resistance RAmax which does not vary over time may be used by the control device for monitoring the welding process from the start of the duration of a start interval TS up to a starting time of the welding process, and the minimum resistance Rmin(t) and maximum resistance Rmax(t) which do vary over time are used for welding process phases following the start interval TS.

In the case of another feature used for the start-up phase of the welding method, another alternative option for monitoring the welding process is initially to use a lower threshold which starts at the minimum resistance RAmin and continuously rises and an upper threshold which starts at the maximum resistance RAmax and continuously decreases for the duration of the start interval DS up to the starting time. The advantage of these features is that the high fluctuations and instabilities which can be expected at the start of a welding process will not trigger a false alarm or lead to an undesirable stoppage of the welding process.

Other features may be used for the welding method whereby the number of times the resistance R(t) moves out of the range between the minimum resistance Rmin(t) and the maximum resistance Rmax(t) is determined and this number is then used as an additional control variable.

In this connection, it is also possible to determine a number of times the resistance R(t) moves outside a range between the minimum resistance RAmin and the maximum resistance RAmax and this number is likewise used as an additional control variable. This enables early detection of a slow and progressive build-up of defects and operating anomalies in the welding apparatus.

The objective of the invention is also independently achieved on the basis of the welding method defined in claim 32. Accordingly, a welding method for running a welding process with a welding rod melting in an arc is proposed, which is supplied with energy from at least one automatically controlled power source. The power source and a device for feeding the welding rod are controlled via a control device, and the welding voltage U(t) is measured during the welding process. As part of the method, minimum points, in particular any short circuits which occur, are determined in the periodic voltage curve plotting the welding voltage U(t) and a period duration TP between two consecutive minimum points is calculated. The control device emits a control signal once an upper threshold value for the period duration TP is exceeded or there is a drop below a lower threshold value and the welding process is halted or a status report of states of the welding process such as the feed status of the rod, the status of the welding torch or the workpiece quality is generated as a function of this control signal.

Advantageous embodiments of the method are described in claims 33 to 37.

To provide a clearer understanding, the invention will be explained in more detail below with reference to examples of embodiments illustrated in the appended drawings.

These provide schematically simplified diagrams as follows.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

Figure 1:
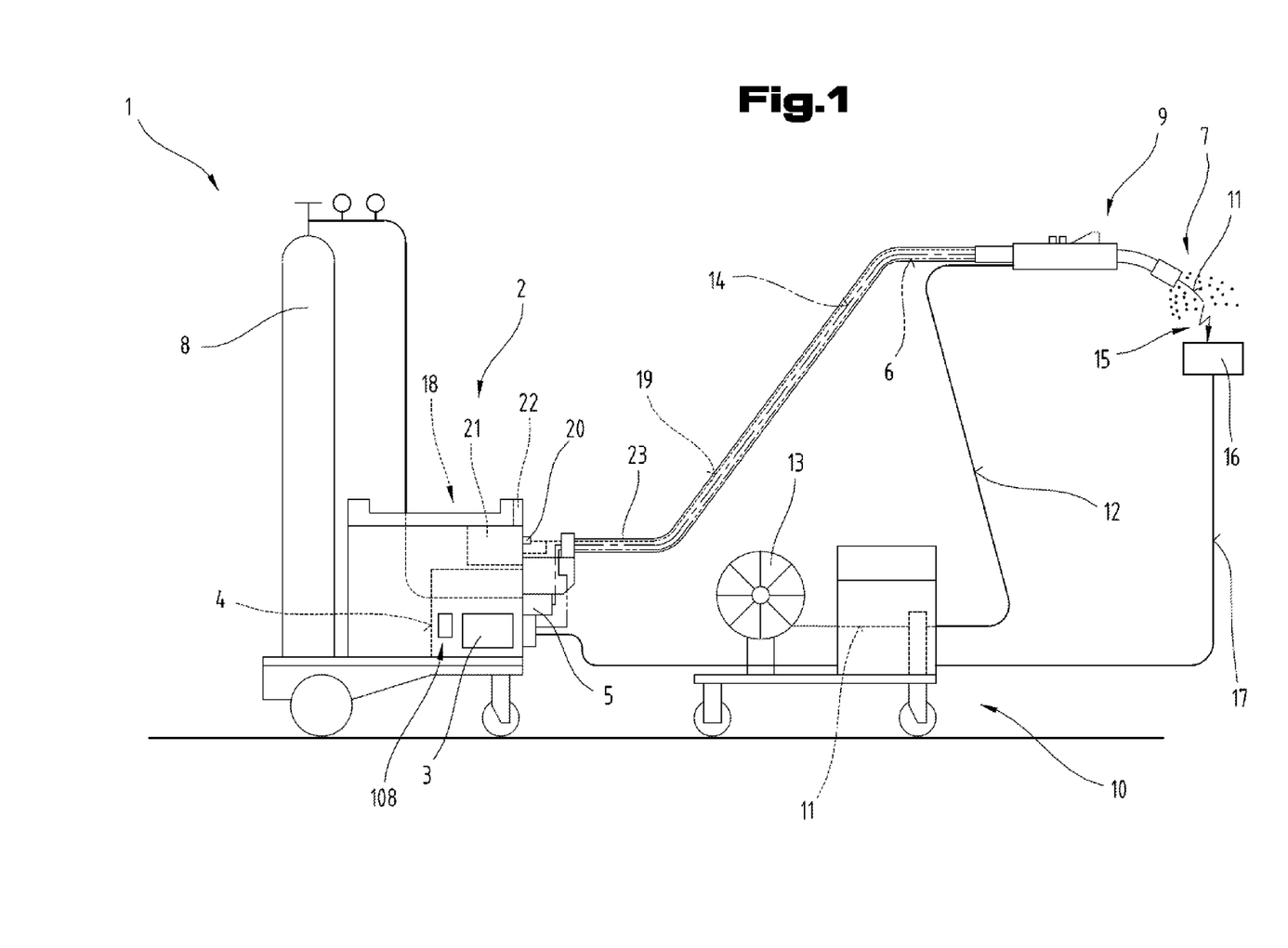
FIG. 1 shows a welding apparatus for implementing a welding method used for arc welding.
Figure 2:
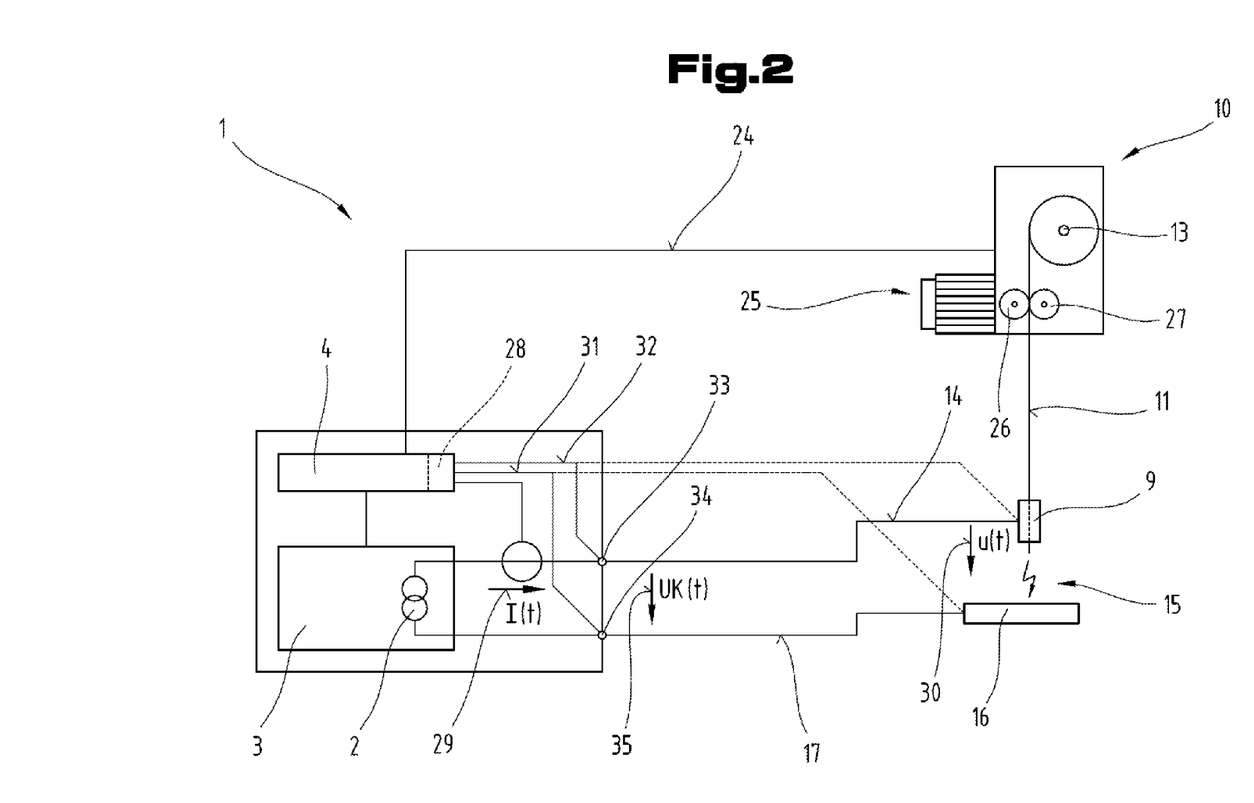
FIG. 2 shows a schematic circuit diagram of the welding current circuit of the welding apparatus 1 together with a workpiece to be welded.

FIGS. 1 and 2 FIG. 1 illustrate a welding system and a welding apparatus 1 for running a whole range of welding processes or welding methods, e.g. MIG-MAG welding or pulsed welding. The welding apparatus 1 has a power source 2 with a power component 3 and a control device 4. The control device 4 is connected to a control valve 5. This control valve 6 is incorporated in a supply line 6 for a gas 7, in particular an inert gas such as $CO_2$, helium or argon and such like, running between a gas storage 8 and a welding torch 9.

Furthermore, a feeding device 10 for a welding rod 11 may also be activated via the control device 4. This being the case, the welding rod 11 is fed from a supply reel 13 through a supply line 12 into the region of the welding torch 9. The feeding device 10 may naturally be also be integrated in the welding apparatus 1 in a manner known from the prior art.

The current needed to strike an arc 15 between the welding rod 11 and a workpiece 16 is fed via a supply line 14 from the power component 3 of the power source 2 to the welding torch 9 and the welding rod 11. The workpiece 16 to be welded is also connected to the welding apparatus 1 and the power source 2 via another supply line 17 so that a closed power circuit can be established across the arc 15.

The welding apparatus 1 may also be equipped with a cooling system 18, in which case liquid can be fed from a coolant container 21 via a cooling circuit 19 with an interconnected flow indicator 20 and a fluid pump to the welding torch 9 in order to cool the latter.

In order to set up different operating modes and the corresponding welding parameters, the welding apparatus 1 is provided with an input and/or output device 22. The operating modes and welding parameters set up via the input and/or output device 22 are then forwarded to the control device 4 which then activates the individual components of the welding system and welding apparatus 1.

The individual cables connecting the welding apparatus 1 to the welding torch 9 are preferably run in a bundle through a hose pack 23.

FIG. 2 shows a schematic circuit diagram of the welding current circuit and the welding apparatus 1 together with a workpiece 16 to be welded.

The individual components of the power component 3 and the power source 2 as well as the control device 4 are integrated in the welding apparatus 1. The power source 2 is connected to the welding torch 9 and workpiece 16 via the supply lines 14, 17. The control device 4, on the other hand, is also connected to the feeding device 10 via a control line 24 so that the feeding device 10 and the process of feeding the welding rod 11 can be controlled on an automated basis. A feed speed "Vd" of the welding rod 11 can be controlled via a drive 25 and conveyor rollers 26, 27 connected to it.

As part of the welding method proposed by the invention, the electrical variables of the welding current circuit are monitored. To this end, the control device 4 has a measuring device 28, with the aid of which instantaneous values of a welding current I(t) 29 and a welding voltage U(t) 30 can be measured. The measuring device 28 is connected to output terminals 33, 34 of the power source 2 via measurement lines 31, 32, enabling a terminal voltage UK(t) 35 to be measured.

Leaving aside the resistance or impedance of the supply lines 14, 17 of the welding current circuit, the terminal voltage UK(t) 35 may be used to represent the welding voltage U(t) 30 and it is therefore not necessary to run the measurement lines 31, 32 to the welding torch 9 and workpiece 16 (indicated by broken lines). Alternatively, the welding voltage U(t) 30 may also be measured directly by contacting the measurement lines 31, 32 with the welding torch 9 and workpiece 15.

Figure 3A:
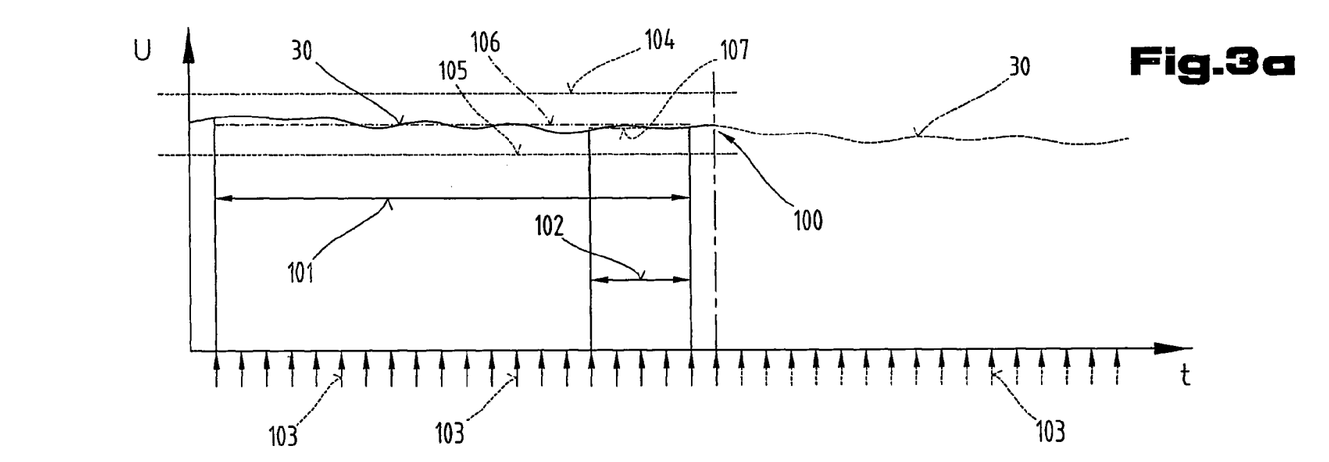
FIG. 3a, b is a diagram showing a schematically illustrated time curve plotting the welding voltage for an arc welding process at a specific point in time and another corresponding diagram at another, later point in time of the welding process.
Figure 3B:
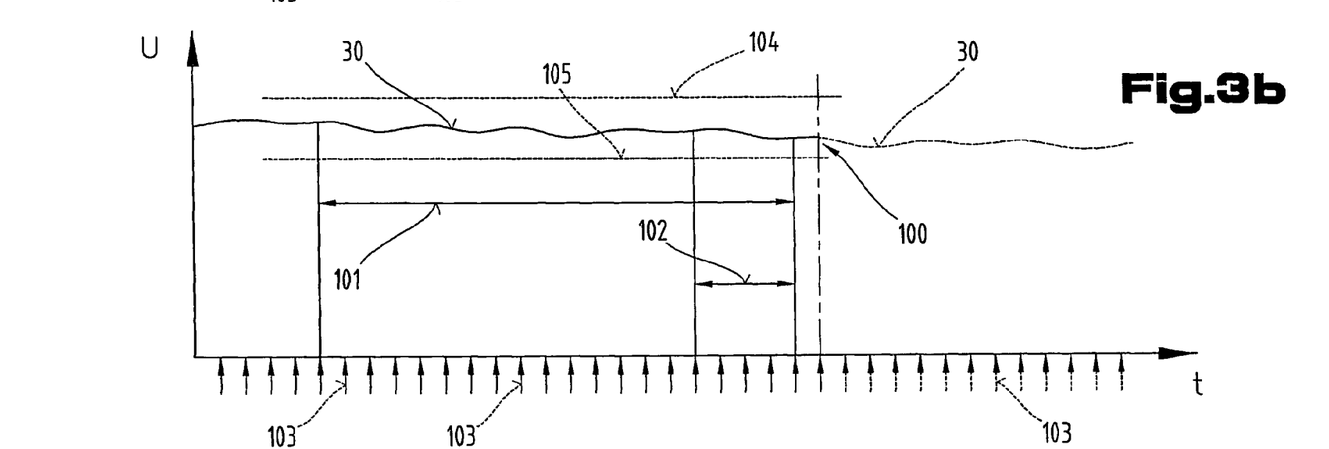

With reference to FIG. 3, a first example of an embodiment of the welding method proposed by the invention will be described. This diagram shows a time curve plotting welding voltage U(t) 30 (the ordinate representing the voltage U and the abscissae representing the time t) for a normal arc welding process, whereas an arc welding process with a so-called short arc will be described with reference to FIGS. 4 and 5.

The time curve of the welding process illustrated in FIG. 3 shows the welding voltage 30 up to a point in time corresponding to a value of the characteristic variable 100 measured instantaneously by the measuring device 28, which is schematically indicated by a dotted-dashed line. The curve representing the welding voltage 30 after that point in time is shown in the diagram by a broken line in order to provide a clearer understanding. In this respect, it should be pointed out that the characteristic variable 100 of the value detected or the value calculated by the measuring device corresponds to one or more welding parameters, i.e. the welding voltage, welding current, resistance, power, etc., and in the embodiment illustrated as an example in FIG. 3, the welding voltage 30 has been used as an example.

The two diagrams in FIG. 3 thus illustrate one and the same welding process but at different points in time, i.e. the welding process was run for differing lengths of time, as indicated by the instantaneous characteristic variable 100 in each case.

As part of the method proposed by the invention, a first time interval 101 and a second time interval 102 as well as a scanning rate 103, schematically indicated by arrows, are fixed in order to determine the characteristic variables, i.e. once the welding apparatus 1 has been started up by the control device 4, the duration for the time intervals 101 and 102 as well as the frequency for the scanning rate 103 at which the characteristic variables 100 are to be determined are set. To this end, the data may be stored in a memory 108 and/or entered and edited by a user. The main point is that the time durations for the time intervals 101 and 102 are significantly different, the first time interval 101 being longer than the second time interval 30. For example, the first time interval may last for 0.5 of a second and the second time interval 0.1 of a second. The scanning rate 103 may be based on a frequency of 20 kHz. By preference, the first time interval lasts for a duration of between 0.3 and 1.0 second and the second time interval lasts for a duration of between 0.05 and 0.3 of a second.

When the welding process is started and an appropriate start-up phase has elapsed in order to stabilise the process, a value of the characteristic variable 100 is determined by the control device 4 and measuring device 28 at each instant of the scanning rate 103 (arrows in FIG. 3), i.e. the characteristic variable 100 is continuously determined on the basis of the frequency set for the scanning rate 103 and stored. To enable the welding process to be automatically controlled by the control device 4, however, only those values of the characteristic variable 100 which lie within the time intervals 101 and 102 earlier in time than the instantaneous value of the characteristic variable 100 are taken into account for the ongoing calculation. The other, previously determined values of the characteristic variable 100 may be stored, for example for quality control purposes, but are not needed for the automatic control process proposed by the invention. This being the case, the time intervals 101 and 102 are coupled with the instantaneous or current characteristic variable 100 and the time intervals 101 and 102 and the measured characteristic variables 100 contained in them are carried forward with the instantaneous characteristic variable 100 during the welding process. This may be seen from the two diagrams shown in FIG. 3 because the instantaneous characteristic variable 100 is shown at different points in time of the welding process and the time intervals 101 and 102 are carried forward as a function of the progress of the welding process over time. Accordingly, the values of the characteristic variable 100 lying within the time intervals 101 and 102 or the quantity of the values contained in them change constantly because the latest characteristic variable 100 is always incorporated in the time intervals 101 and 102 and the oldest characteristic variable 100 is therefore discarded from the time intervals 101 and 102.

Once the welding process has started, in other words once the start-up phase has terminated, and a number of individual values of the characteristic variable 100 have been determined for the time intervals 101 and 102, the control device 4 calculates from these values of the characteristic variable 100 lying within the time intervals 101 and 102 a first mean value 106 for the first time interval 101 and a second mean value 107 for the second time interval 102. From the first mean value 106 of the first time interval 101, an upper and a lower threshold value 104 and 105 are then calculated. The second mean value 107 for the second time interval 102 is used as a control variable and is compared with the upper and lower threshold value 104 and 105. In this respect, it is preferable if the threshold values 104 and 105 are selected so that they are as close as possible to the first mean value 106, i.e. an increase or reduction of 10% of the mean value 106 is used so that as narrow as possible a tolerance window is set. In this respect, it is possible to set or calculate the threshold values 104 and 105 in different ways as a function of other set welding parameters, for example as a function of the material to be welded, the welding rod, etc.

Due to the differing lengths or durations of the time intervals 101 and 102, they also contain different numbers of values for the characteristic variable 100, resulting in different mean values 106, 107 accordingly. It is also possible for the duration of the second time interval 102 to be selected such that it is so short that it contains only a single value for the characteristic variable 100, in which case control takes place on the basis of the last value detected for the characteristic variable 100, which therefore simultaneously constitutes the control variable.

Based on a control method of this type where the first time interval 101 contains several measured values of one or more characteristic variables 100, the threshold values 104 and 105 for monitoring the curve of the characteristic variable 100 to be monitored may be set very close to this characteristic variable 100 or the corresponding welding parameter, thereby enabling a very rapid change in the curve of the characteristic variable 100 or welding parameter to be detected.

It is of advantage to use a second time interval 102 for comparing the characteristic variable 100 with the calculated threshold values 101 and 102 because brief changes of state often occur during a welding process, for example caused by impurities on the workpiece 16 etc., which cause a brief change in the characteristic variable 100 but have no major effect on the process. In other words, only the last determined value of the characteristic variable 100 is used, which means that it changes frequently and exceeds the threshold values 101 and 102, as a result of which an action which is not actually necessary is initiated by the control device 4. To ensure that this does not keep happening, the second time interval 102 with a significantly shorter duration is incorporated in the automatic control process so that a mean value 107 can be used for the comparison with the threshold values 101 and 102 and brief but significant changes do not immediately have an impact.

It is also possible to opt for an equivalent system instead of the first and second time intervals 101 and 102 based on a selectable number of values for the characteristic variable 100, i.e. the first number may comprise 1000 values for the characteristic variable 100 and the second number may comprise 10 values for the characteristic variable 100, from which the mean values 106, 107 are then derived. This can easily be set up in the form of a sort of sliding register to which the last of the detected values for the characteristic variable 100 is always added and the values for the characteristic variable 100 lying farthest back in time are discarded. Another option is to adopt this approach using a memory known from the prior art, in other words based on the so-called first-in last-out principle.

As regards this automatic control process, it may therefore be said that welding process data is determined from a defined number of mean values 106, 107 and, from the first mean value 106 derived from a significantly larger number of values, threshold values 104 and 105 lying as close as possible to the first mean value 106 are calculated and these threshold values 104 and 105 are compared with the second mean values 107 derived from significantly fewer values. These mean values can be derived from a whole range of different welding parameters, such as short circuits, welding current, welding voltage, a calculated or detected resistance, a calculated or detected power, etc., for example.

The schematically illustrated method described above will now be explained in more detail on the basis of examples illustrated in the following drawings.

Figure 4:
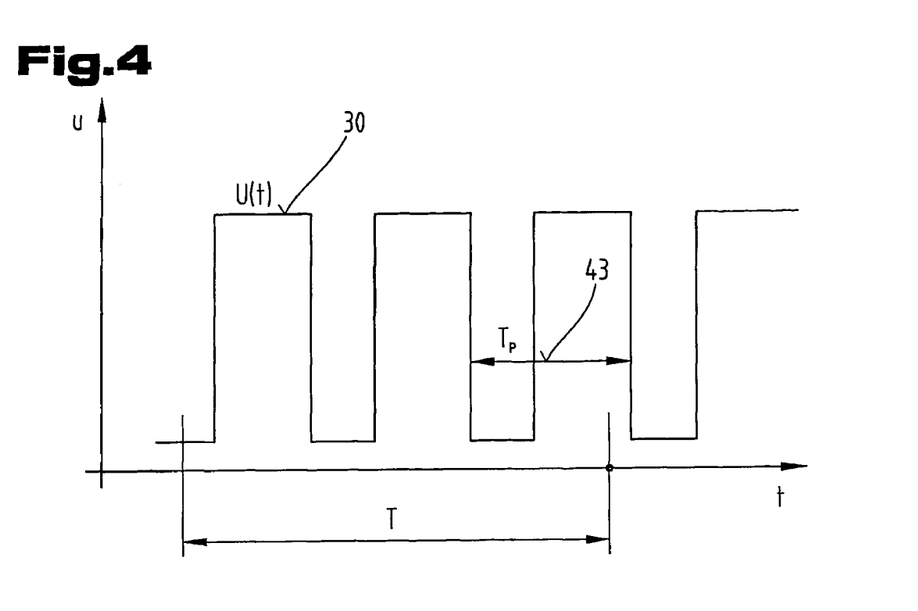
FIG. 4 is a diagram showing a schematically illustrated time curve plotting the welding voltage U(t) for an arc welding process.
Figure 5:
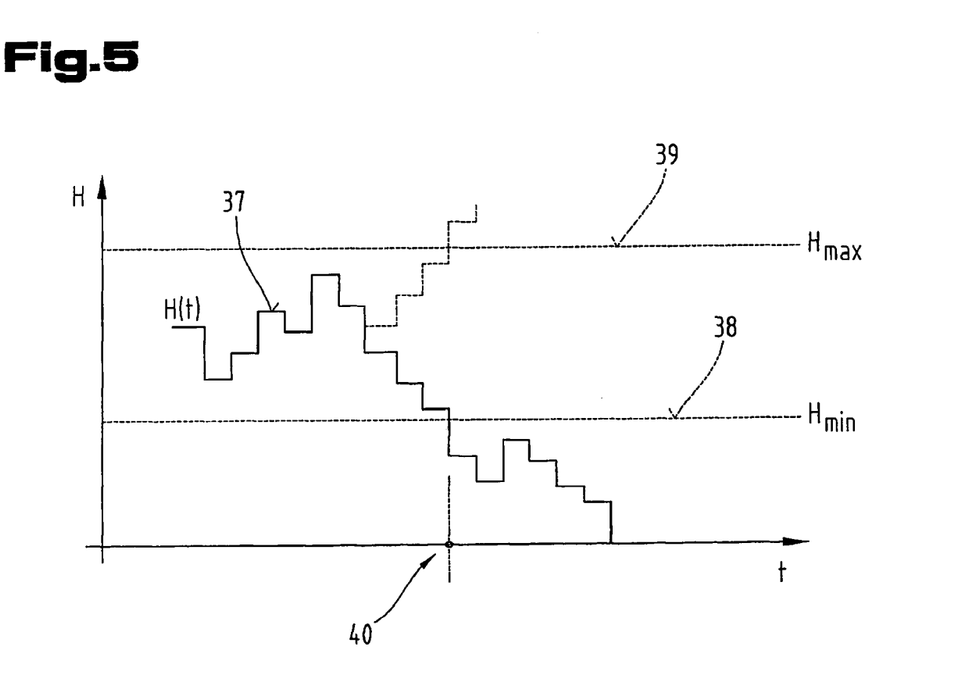
FIG. 5 is a diagram plotting a time curve for the frequency H(t) at which short circuits occur on the basis of FIG. 4.

FIGS. 4 and 5 illustrate another example of an embodiment of the welding method proposed by the invention. FIG. 4 is a diagram of the time curve plotting the welding voltage U(t) 30 (the ordinate representing the voltage U and the abscissae representing the time t) for an arc welding process with a so-called short arc. In the case of such a welding process, melting the welding rod 11 into the arc 15 causes a liquid metal drop to form which, when detached from the welding rod 11, briefly causes an electric short circuit between the welding rod 11 and workpiece 16 or the melt bath on the workpiece 16. This short circuit causes the welding voltage U(t) 30 to drop sharply for the duration of the short circuit. As soon as the metal drop has completely detached from the welding rod 11 and connected with the workpiece 16 or weld seam, the welding voltage U(t) 30 rises again. This causes a periodic series of low and high values for the welding voltage U(t) 30, resulting in the voltage curve for the welding voltage U(t) 30 plotted on a simplified basis in the diagram of FIG. 4. Periodic short circuits are shown by parts of the curve for the welding voltage U(t) 30 with low values. A stable welding process curve has a more or less constant number of short circuits during a time interval T. In a real welding process, however, this number will fluctuate as a function of time.

FIG. 5 shows a diagram plotting the time curve for a frequency H(t) 37 of the occurrence of short circuits during the tune interval T illustrated in FIG. 4 (the ordinate representing the frequency of the occurrence of short circuits H and the abscissae representing the time t).

The instantaneous values for the frequency H(t) 37 of the occurrence of short circuits, which varies over time, are continuously recorded in the control device 4 of the welding apparatus 1, thereby enabling the welding process to be monitored. To this end, a minimum frequency Hmin 38 constituting a lower threshold and a maximum frequency Hmax 39 constituting an upper threshold are stored in the control device 4 or in a software-based monitoring module incorporated in it, and the control device 4 constantly runs a comparison of the instantaneous frequency H(t) 37 with these upper and lower thresholds. The values for these thresholds, i.e. the minimum frequency Hmin 38 and the maximum frequency Hmax 39, may be values derived from experience or from welding tests.

The way in which the welding process is monitored by the control device 4 will be explained in more detail with reference to the time curve plotting frequency H(t) 37 illustrated in FIG. 5. For times lying before an instant 40, the values representing the frequency H(t) 37 lie between the minimum frequency Hmin 38 and the maximum frequency Hmax 39 and the welding process is regarded as correct or fault-free for the period lying before the instant 40. During the final phase of this period, the frequency H(t) 37 drops again and finally falls below the value of the minimum frequency Hmin 38 at the instant 40, and this event is classed by the control device 4 as the occurrence of an error function in the welding process, whereupon the control device 4 generates a control signal. The error function detected by the control device 4 at instant 40 might have occurred because the feed rate Vd of the welding rod 11 has fallen too low or has fallen too far below its desired value, for example. The control signal generated by the control device 4 may now be used as a trigger for the control device 4 to initiate different counter-measures. Triggered by the control signal, the drive 25 of the feeding device 10 can be activated by the control device 4 so that the feed rate Vd of the welding rod 11 is increased and the frequency H(t) 37 assumes a value lying between the minimum frequency Hmin 38 and the maximum frequency Hmax 39 again. Another reason why the frequency H(t) 37 might fall below the minimum frequency Hmin 38 could be that the welding rod 11 has jammed or become blocked in the welding torch 9 or contact pipe of the welding torch 9, thereby causing so-called back-burning of the welding rod 11, which in turn causes the welding rod 11 to become welded to the contact pipe of the welding torch 9. The control device 4 can be programmed so that the welding process is interrupted on emission of the control signal by switching off the welding current I(t) 29 or welding voltage U(t) 30 and stopping the drive 25 of the feeding device 10.

Naturally, situations may also occur where the frequency H(t) 37 exceeds the upper threshold of the value for the maximum frequency Hmax 39, as indicated by broken lines in FIG. 5. For example, due to an increase in the feed rate Vd of the welding rod 11 caused by too high a rise above its desired value, the instantaneous frequency H(t) 37 rises so steeply that it ultimately causes the arc 25 to be completely extinguished, resulting in a permanent short circuit between the welding rod 11 and workpiece 16. In this situation, the control device 4 generates a control signal when the upper threshold is exceeded, i.e. the value of the maximum frequency Hmax 39. From emission of this control signal, the control device 4 activates the drive 25 of the feeding device 10 in such a way that the feed rate Vd of the welding rod 11 is reduced to its desired value.

Figure 6:
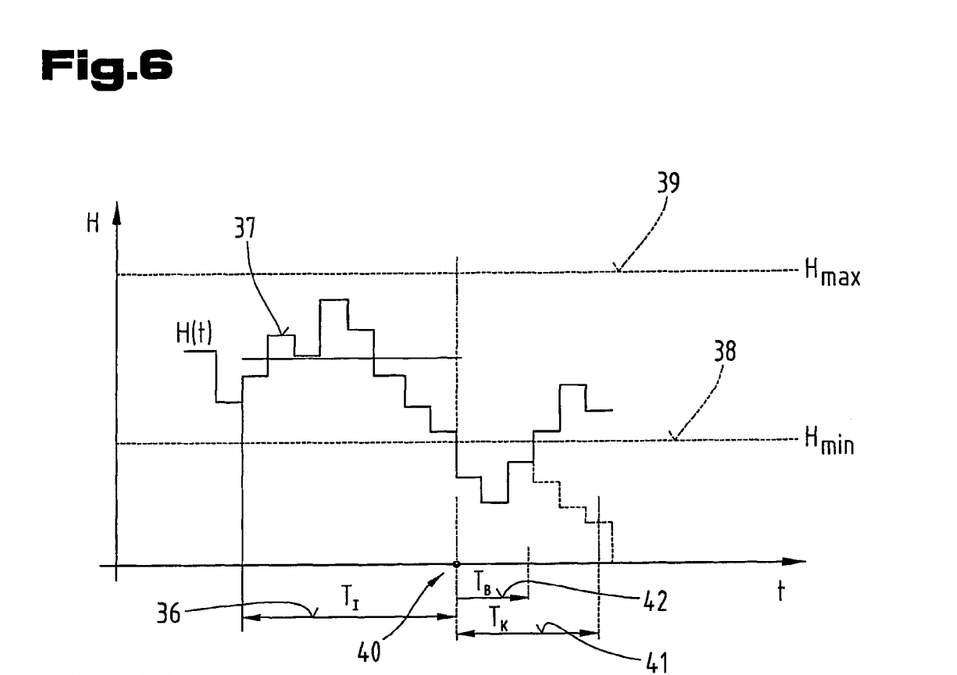
FIG. 6 shows a curve plotting the frequency H(t) of another example of an embodiment of the welding method.

FIG. 6 is a diagram plotting the time curve for the frequency H(t) 37 based on another example of an embodiment of the welding method (the ordinate representing the frequency of the occurrence of short circuits H and the abscissae representing the time t).

In an alternative embodiment of the described method, the upper and lower threshold value for the frequency H(d) 37, i.e. the maximum frequency Hmax(t) 39 and the minimum frequency Hmin(t) 38, are derived from threshold values which vary over time. To this end, values for the control variable, i.e. values for the frequency H(t) 37, are recorded and stored in the control device 4 at least over a period of a pre-definable time interval TI 36 (corresponding to the first time interval 101). Using those values which lie precisely in the time interval TI 36, a mean value (corresponding to the first mean value 106 shown in FIG. 3) for the control variable is calculated and from it the upper and lower threshold value (corresponding to the threshold values 104 and 105) are set, i.e. the maximum frequency Hmax(t) 39 and the minimum frequency Hmin(t) 38. By contrast with threshold values which do not vary over time, upper and lower threshold values 104 and 105 for the control variable frequency H(t) 37 which do vary over time offer an advantage in that they can be applied in a very flexible manner and the range between the threshold values 104 and 105 can be selected so that it is very narrow. The threshold values 104 and 105 may exhibit a difference compared with the mean value of the control variable which is only a small fraction of the mean value of the control variable. In order to monitor the welding process, when the instantaneous value of the frequency H(t) 37 exceeds the upper threshold value 104 or drops below the lower threshold value 105, the control device 4 generates a control signal. As a function of the control signal, therefore, the control device 4 can interrupt the welding process or a status report listing statuses of the welding process or individual components of the welding system is generated. The particular advantage of this is that damage to the welding system due to so-called rod back-burning can be prevented. To this end and as a function of the control signal, the feed rate of the feeding device 10 for the welding rod 11 is changed in an appropriate manner, for example. In order to obtain upper and lower threshold values 104 and 105 for the control variable which vary over time, the mean value of the control variable as well as the upper and lower threshold values 104 and 105 calculated from it are continuously recalculated over time. The time interval TI 36 (corresponding to the first time interval 101) lying before the instantaneous value of the control variable therefore constitutes a time window for selecting those values of the control variable which will be used to calculate and recalculate the upper and lower threshold values 104 and 105. The time interval TI 36 is therefore carried forward in time to a certain degree. It is of advantage if the respective position of the time interval TI 36 in time is selected so that it immediately precedes the last determined value of the control variable.

To this end, the value of a control period TK 41 is also stored in the control device 4 in addition to the lower and upper threshold for the frequency H(t) 37. If the frequency H(t) 37 drops below the minimum frequency Hmin 38 at the instant 40, the control device 4 initiates the measurement of an observation period TB 42 which lasts for as long as the instantaneous value for the frequency H(t) 37 is below the minimum frequency Hmin 38. Provided this observation period TB 42 is shorter than the predefined control period TK 41, the welding process is still classed by the control device 4 as being stable or correct. In other words, if the instantaneous frequency H(t) 37 exceeds the value of the minimum frequency Hmin 38 and changes within the range of the minimum frequency Hmin 38 and the maximum frequency Hmax 39 before the control period TK 41 has elapsed, the control device 4 does not generate a control signal (solid part of the curve plotting the frequency H(t)). If, on the other hand, the instantaneous frequency H(t) 37, having dropped below the minimum frequency Hmin 38 at the instant 40, remains below the minimum frequency Hmin 38 for an observation period TB 42 which is longer than the control period TK 41, the control device 4 will generate a control signal (indicated by the part of the curve plotting the frequency H(t) shown by broken lines). From this control signal, the control device 4 can then initiate various measures. These might include an appropriate counter-measure involving activating the feeding device 10, as explained above, for example, or other components of the welding apparatus 1 may be activated by the control device 4, such as the cooling system 18 for example, or an alarm may simply be triggered and the welding process completely halted.

The way in which the welding process is monitored using an alternative example of an embodiment of the welding method proposed by the invention will be explained with reference to FIG. 4. In this instance, instead of using the frequency H(t) 37 as a control variable, a period duration TP 43 corresponding to the time interval between two consecutive short circuits or minima in the time curve of the welding voltage U(t) 30 is used. As with the time curve H(t) 37, the control device 4 records the time curve and the change in the period duration TP 43, and the control device 4 runs a continuous comparison with a lower and an upper threshold for the die period duration TP 43. This being the case, when a maximum value or the upper threshold for the period duration TP 43 is exceeded, the control device 4 can also generate a control signal. Moving above an upper threshold for the period duration 43 also corresponds to a drop below the minimum frequency Hmin 38 by the instantaneous frequency H(t) 37 and similar control measures are also initiated by the control device 4, as described above in connection with the frequency H(t) 37.

When using the period duration TP 43 as a control variable to monitor the welding process, minimum points, i.e. in particular short circuits which occur, are therefore determined in a periodic voltage curve plotting the welding voltage U(t) 30 by analysing the continuously recorded voltage curve plotting the welding voltage U(t) 30, and period durations TP 43 between two consecutive minimum points are respectively calculated. If an upper threshold value 104 is exceeded or there is a drop below a lower threshold value 105 for the period duration TP 43, the control device 4 will then generate a control signal, after which the control device 4 will halt the welding process or generate a status report depending on the control signal. Any move outside an upper threshold value 104 and 105 for the period duration TP 43 will preferably represent a prompt to halt the welding process because this will most probably have been caused by "back-burning of the rod". As explained above in connection with the frequency H(t) 37, it is also possible to use upper and lower threshold values 104 and 105 for the period duration TP 43 which vary over time.

Figure 7:
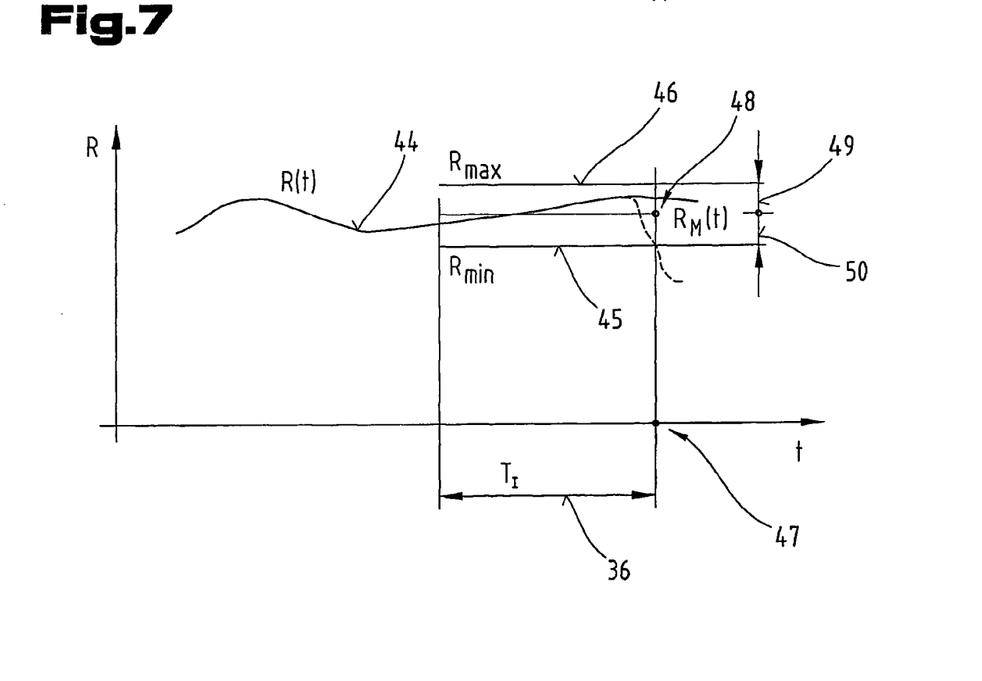
FIG. 7 is a diagram of the time curve plotting the instantaneous resistance R(t) of an arc.

An example of an embodiment of the welding method using an instantaneous resistance R(t) 44 of the arc 15 will now be described with reference to FIGS. 7 to 10, i.e. the welding voltage and welding current are measured and the resistance R(t) 44 is calculated from them as a characteristic variable 100. FIG. 7 is a diagram of the time curve plotting the resistance R(t) 44 (the ordinate representing the resistance R and the abscissae representing the time t), calculated from the welding voltage U(t) 30 and welding current I(t) 29 in accordance with Ohm's law. In order to monitor the welding process using this welding method, the control device 4 runs a continuous comparison of the instantaneous resistance R(t) 44 with a minimum resistance Rmin 45 (corresponding to the lower threshold value 105 for the first time interval 101) and a maximum resistance Rmax 46 (corresponding to the upper threshold value 104 for the first time interval 101). If the instantaneous resistance R(t) 44 (corresponding to the mean value of the characteristic variable resistance for the second time interval 102) exceeds the maximum resistance Rmax 46 or drops below the minimum resistance Rmin 45, a control signal is generated by the control device 4, as will be explained below.

In the case of this example of an embodiment, the values for the minimum resistance Rmin 45 and maximum resistance Rmax 46 are not set on the basis of absolute, i.e. fixed, values and instead they will depend on the time curve plotting resistance R(t) 44. To this end, at every instantaneous instant 47, a mean resistance RM(t) 48 is calculated during the time interval TI 36 immediately preceding the instantaneous instant 47. By recording or storing individual values for the resistance R(t) 44 in the control device 4, a number of individual values determined from the duration of the time interval TI 36 is available for calculating these mean values. The lower as well as the upper threshold for resistance R(t) 44 are therefore also dependent on time and changes over time. The maximum resistance Rmax(t) 46 is therefore derived from the resistance RM(t) 48 by adding to the calculation an upper resistance difference Reo 49, and the minimum resistance Rmin(t) 45 is derived from the mean resistance RM(t) 48 by subtracting a lower resistance difference Reu 50. Like the mean resistance RM(t) 48, the values representing the minimum resistance Rmin(t) 45 and maximum resistance Rmax(t) 46 are also continuously recorded by the control device 4 for monitoring the welding process, and the control device 4 ascertains whether the instantaneous resistance R(t) 44 exceeds or falls below these lower and upper thresholds. If such is the case, the control device 4 can generate a control signal and from then can initiate other actions of individual components of the welding apparatus on the basis of appropriate control commands issued by the control device 4. This is illustrated by a drop below the minimum resistance Rmin(t) 46 at instant 47 in FIG. 7 denoted by the part of the time curve for resistance R(t) 44 plotted in broken lines.

Using the threshold values 104 and 105 which vary over time for the lower and upper threshold of the control variable enables a very flexible implementation of the method on the one hand and results in a very rapid response to sudden changes which occur in the welding process or operation of the welding system on the other hand. Carrying the upper and lower threshold values 104 and 105 forward in time as a function of the mean value of the control variable means that it is possible for these threshold values 104 and 105 to be set very closely around the instantaneous curve of the control variable, i.e. the instantaneous resistance R(t) 44 (for the second time interval 102). The difference between the threshold values 104 and 105 and the mean value of the control variable may advantageously be selected within a range of less than 1% of the instantaneous resistance R(t) 44. This being the case, the duration of the time interval TI 36 (of the first time interval 101) has a value of less than 1 second.

The example of an embodiment illustrated here, using the instantaneous resistance R(t) 44 as a control variable for monitoring the welding process, is particularly well suited for use with corona arc or pulsed welding processes, as well as with arc welding processes with a controlled forward and backward oscillating movement of the welding rod 11.

Figure 8:
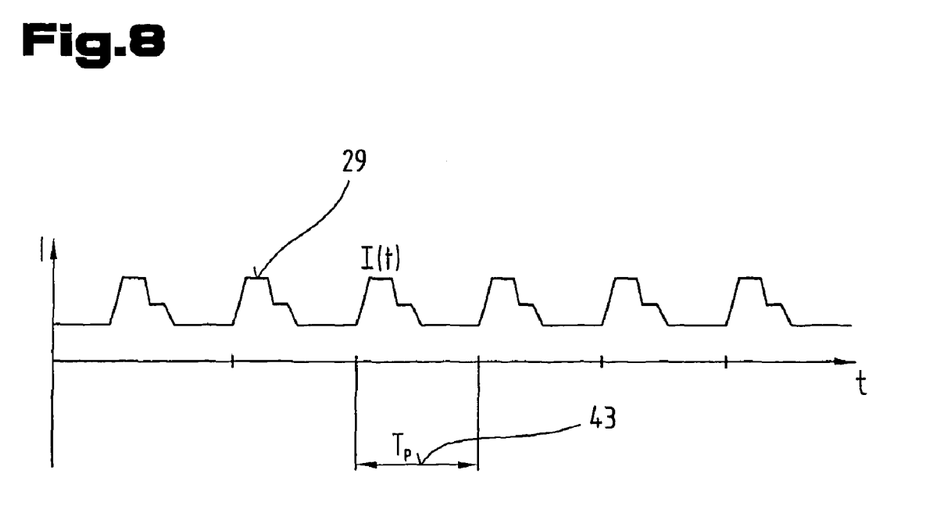
FIG. 8 shows a time curve plotting the welding current I(t) during a pulsed welding process.
Figure 9:
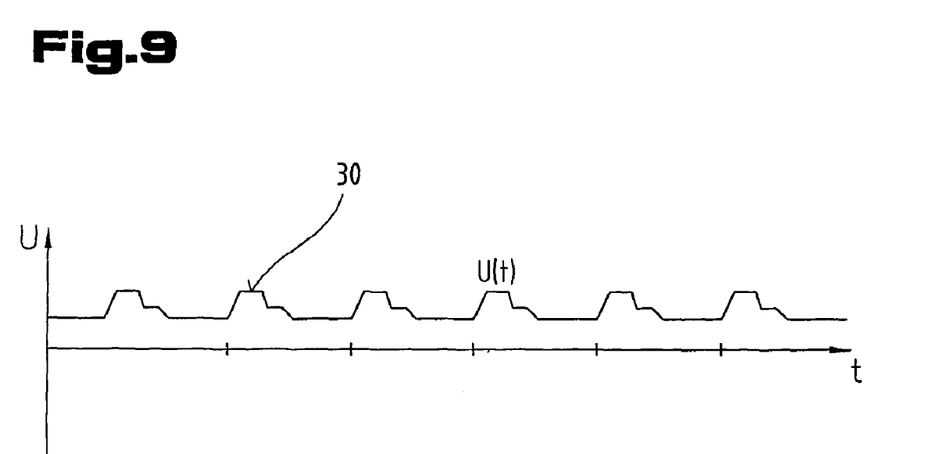
FIG. 9 shows a time curve plotting the welding voltage U(t), corresponding to the pulsed welding process based on FIG. 8.

FIGS. 8 and 9 illustrate examples of the time curve plotting the welding current I(t) 29 (FIG. 8; the ordinate representing the current I and the abscissae representing the time t) and welding voltage U(t) 30 (FIG. 9; the ordinate representing the voltage U and the abscissae representing the time t). In this instance, a pulse period is advantageously used as the control variable for resistance R(t) 44 instead of a mean value over at least one period duration TP 43. This averaging corresponds to the second mean value 107 for the second time interval 102 as described in connection with FIG. 3. The advantage of this is that excessive fluctuations in the time curve plotting resistance R(t) 44 (FIG. 7) are avoided because these have proved to be less significant when it comes to monitoring the welding process.

Alternatively, it would also be possible to use values of the welding voltage I(t) 29 or welding voltage U(t) 30 from a pulse phase, i.e. the maximum values of the current and voltage curve in each case, in order to calculate the resistance R(t) 44, for example.

Figure 10:
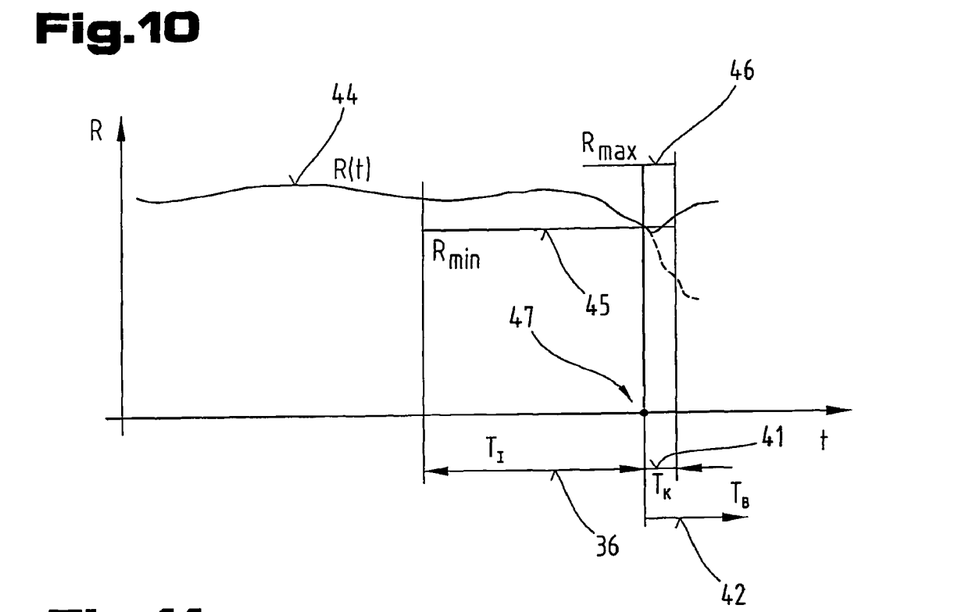
FIG. 10 is a diagram of a curve which varies over time plotting the instantaneous resistance R(t) of an arc.

Another example of an embodiment of the welding method using the resistance R(t) 44 as a control variable for monitoring the welding process will now be explained with reference to FIG. 10 (the ordinate representing the resistance R and the abscissae representing the time t). If the instantaneous resistance R(t) 44 falls below the value for the minimum resistance Rmin 45 at instant 47, the control device 4 will initiate measurement of the observation period TB 42. This will last for as long as the instantaneous resistance R(t) 44 lies below the minimum resistance Rmin 45. Provided this observation period TB 42 is shorter than the predefined control period TK 41, the welding process will be classed as stable and correct by the control device 4. If the instantaneous resistance R(t) 44 moves back into the range between the minimum resistance Rmin 45 and the maximum resistance Rmax 46 before the control period TK 41 has elapsed, no control signal will be generated by the control device 4. Those values of the minimum resistance Rmin(t) 45 or maximum resistance Rmax(t) 46 resulting from the mean resistance RM(t) 48 at instant 47 will be used as the lower and upper thresholds. Alternatively, it would also be possible to recalculate the mean resistance RM(t) 48 continuously, including during the course of the control period TK 41, thereby resulting in a change in the lower and upper threshold 45, 46 accordingly.

In the case of the embodiment described as an example here, the control device 4 is programmed so that if the instantaneous resistance R(t) 44 remains below the minimum resistance Rmin 45, having dropped below the minimum resistance Rmin 45 at instant 47, for an observation period TB 42 which is longer than the control period TK 41, a control signal is generated by the control device 4. It may also be used to trigger an alarm or automatically halt the welding process. An example of such a situation in which the minimum resistance Rmin 45 drops below the lower threshold for an observation period TB 42 which is longer than the control period TK 41 is illustrated by the curve plotting the instantaneous resistance R(t) 44 in broken lines in FIG. 10.

In order to calculate the mean resistance RM(t) 48, different ranges in the time interval TI 36 (corresponding to the first time interval 101) may be weighted to different degrees, and this approach may also be adopted with respect to the second time interval 102. For example, an appropriate weighting factor may be used so that ranges at the start of the time interval TI 36 may contribute more to determining the mean value than ranges closer to the end of the time interval TI 36. It has proved to be of practical advantage to use values from a range of 200 ms to 950 ms for the duration of the time interval TI 36. A value in the order of 10 ms is selected for the control period TK 41.

Figure 11:
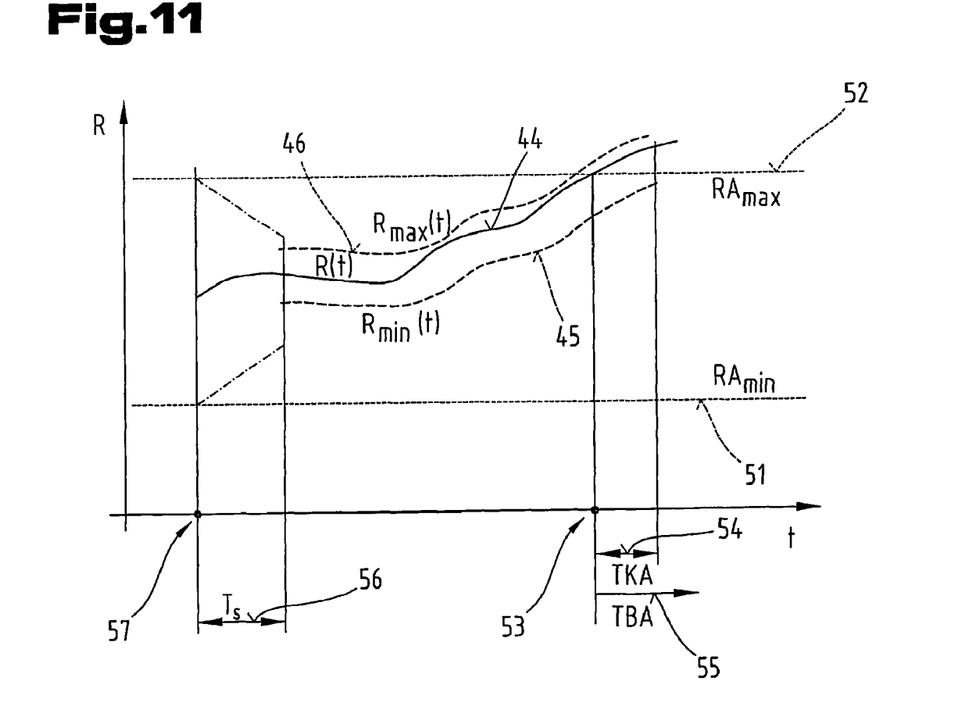
FIG. 11 is a diagram showing the time curve plotting the instantaneous resistance R(t) of the arc with upper and lower thresholds which vary over time and upper and lower thresholds which do not vary over time.

FIG. 11 illustrates another example of an embodiment of the welding method proposed by the invention using the resistance R(t) 44 as a control variable for monitoring the welding process (the ordinate representing the resistance R and the abscissae representing the time t).

FIG. 11 is a diagram plotting the time curve for the resistance R(t) 44 (corresponding to a mean value for the second time interval 102) as well as the upper and lower thresholds which vary over time, i.e. the minimum resistance Rmin(t) 45 and the maximum resistance Rmax(t) 46 (corresponding to the first time interval 101 illustrated in FIG. 3). In this case, a predefined, absolute minimum resistance RAmin 51 and an absolute maximum resistance RAmax 52 are firstly stored in the control device 4. As illustrated in the diagram of FIG. 11, relatively slow changes over time in the resistance R(t) 44 respectively time-variable lower and upper thresholds are possible, i e minimum resistance Rmin(t) 45 and maximum resistance Rmax(t), without an error function being detected by the control device 4. In order to guarantee the functional safety of the welding apparatus 1 during such procedures and prevent damage to the welding apparatus 1, however, the above-mentioned threshold values 51, 52 are used in this example of an embodiment.

These threshold values 51, 52, i.e. the absolute maximum resistance RAmax 52 and the absolute minimum resistance RAmin 51, represent a broad tolerance window for the instantaneous resistance R(t) 44 as it were, which is set around an averaged operating point determined from a data bank. This enables rough errors in the welding process to be detected by the control device 4. These absolute threshold values 51, 52 may also be used in the start-up phase of a welding process for monitoring purposes when greater instabilities can be anticipated in the welding process.

It is clear from the diagram illustrated in FIG. 11 that the difference between the time-variable upper and lower threshold values, i.e. the maximum resistance Rmax(t) 46 and minimum resistance Rmin(t) 45, may be selected so that it is significantly lower than the difference between the threshold values 51, 52, i.e. maximum resistance RAmax 52 and minimum resistance RAmin 51, which do not vary over time. The difference between the time-variable threshold values may in any event represent a small fraction of the difference between the threshold values 51, 52 which do not vary over time.

The control device 4 of the welding apparatus 1 continuously runs a comparison of the value representing the resistance R(t) 44 (corresponding to the second time interval 102) with the minimum resistance RAmin 51 and maximum resistance RAmax 52. To enable the control device 4 to detect an error function, when the maximum resistance RAmax 52 is exceeded at an instant 53 in a first variant, a control signal is issued by the control device 4. It is preferable if the control device 4 automatically halts the welding process in response to this control signal.

In an alternative embodiment, on the other hand, a control signal is not triggered immediately the maximum resistance RAmax 52 is exceeded or there is a drop below the minimum resistance RAmin 51, and instead, the latter is delayed in time. To this end, a control period TKA 54 for the absolute thresholds is stored in the control device 4. Once the maximum resistance RAmax 52 has been exceeded by the instantaneous resistance R(t) 44 at instant 53, the control device 4 starts measuring an observation period TBA 55 which lasts for as long as the instantaneous resistance R(t) 44 lies above the maximum resistance RAmax 52 or below the minimum resistance RAmin 51. A control signal is triggered or generated by the control device 4 if this observation period TBA 55 is longer than the predefined control period TKA 54.

For the duration of a start interval TS 56 commencing at a starting time 57 of the welding process, only the absolute thresholds of the minimum resistance RAmin 51 and maximum resistance RAmax 52 or the threshold values 51, 52 are used by the control device 4 to monitor the welding process. It is not until after the start interval TS 56 that the control device 4 switches to the more narrowly set upper and lower thresholds 104 and 105 for monitoring, i.e. the minimum resistance Rmin(t) 45 a maximum resistance Rmax(t) 46. Alternatively, another option in this respect is for the control device 4 to use a tolerance range for the upper and lower thresholds for resistance R(t) 44 which becomes continuously narrower as a means of monitoring the welding process for the duration of the start interval TS 56 (indicated by a dotted-dashed line).

A value in the order of 10 ms is advantageously used as the value for the control period TKA 54, whereas it has proved to be of advantage to use a range of from 200 ms to 950 ms as the value for the duration of the start interval TS 56.

It is possible to initiate various measures automatically in response to the control signal generated by the control device 4 using the method proposed by the invention. As described above, these might include triggering an alarm, influencing the change in operation of different components of the welding apparatus, halting the welding process, as well as generating a message to operating personnel to replace a defective contact pipe or a defective welding torch. It would also be conceivable for other causes to trigger a control signal. In addition to those mentioned above, another cause might be contamination on the workpiece 16, for example due to oil or separating agent, or alternatively anomalies with respect to the inert gas properties of the gas 7.

The invention was described above using the frequency H(t) 37 and the period duration TP 43 over which short circuits occur and the instantaneous value of the resistance R(t) 44 as control variables. However, it would naturally also be possible to use other physical variables, such as the power of the arc as a control variable within the meaning of the invention. Likewise in the case of these variables, it is possible to record them throughout the duration of the time interval TI 36 and the time intervals 101 and 102 as values for the control variable and store them in the control device 4 to enable a mean value of the control variable to be calculated from the values lying within this time interval and set upper and lower threshold values for the control variable on this basis. In this respect, the mean values for the control variable as well as the upper and lower threshold values 104 and 105 are constantly recalculated on an ongoing basis because the time intervals 101 and 102 lying before the instantaneous value of the control variable are carried forward in time. If the upper threshold value 104 is exceeded or there is a drop below the lower threshold value 105 by the instantaneous value of the control variable, the control device 4 generates a control signal, as a result of which the welding process is halted and a status report can be generated about the states of different components of the welding system.

Another option is to apply the threshold for the threshold value 51, 52 from the last welding operation and calculate the threshold values 51, 52 from a data bank or store them in it.

It is also possible to take the characteristic variables 100 stored for the welding voltage and welding current and store these and then apply a mean value of the resistance or power as the control variable or characteristic variable 100 during the time intervals 101 and 102. It would naturally also be possible to convert a resistance or the power continuously to the characteristic variables 100 for the welding voltage and welding current and store these as a characteristic variable 100 for the time intervals 101 and 102, after which the mean value can then be determined during the period of the time intervals 101 and 102. In other words, two of the welding parameters can be converted to a characteristic variable 100 to determine the mean values either immediately or during the time intervals 101 and 102.

Another option is that when there is a rise above or a drop below the threshold values 104 and 105 by the mean value of the second time interval 102 for the first time, a control period 54 or an observation period 55 is not initiated, and instead a counter is started which counts up or down for as long as the mean value is above or below the threshold value 104 or 105, and the control signal is then emitted on reaching a specific counter status. The counter can then be re-set. In this respect, it is also possible to store several counter statuses as thresholds so that different control signals are emitted depending on the counter status.

To enable the user to run all the standard options with the welding apparatus 1, the control device 4 may treat a change in the operating point during the welding process, in particular a change of job by the user, as a re-start of the welding process or the characteristic variables can be ignored for a defined period. This prevents a rise above or a drop below the threshold values 104, 105 from taking immediate effect due to a change made by the user and this will not be effective until a stable welding process exists again.

Another option is one whereby the control device 4 skips the characteristic variables following an external signal for a predefined period or during the time the external signal exists or until another external signal appears and these characteristic variables 100 are therefore not used for evaluating the mean values. This is of advantage because in the case of automated welding operations, the position of the welding torch is frequently changed so that different parameters prevail. This will be the case if a horizontal welding operation is switched to a vertical welding operation, for example. In the situation of welding with a robot, it would also be possible for the control device 4 to monitor the robot axes, for example, in which case the control device 4 will then calculate whether monitoring the welding process on the basis of a mean value goes against the prescribed set of rules or is meaningful and should proceed on this basis.

By preference, the threshold values 104, 105 for the first mean value of the first time interval 101 are increased or reduced by the control device 4 during a short arc-welding method by 6%, during a pulsed welding method by 2.5% and during a spray arc welding method by 2.0%. The duration of the first time interval 101 may be between 0.3 sec. and 1.0 sec., in particular 0.5 sec., whereas the duration of the second time interval 102 is between 0.05 sec. and 0.3 sec., in particular 0.1 sec.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

The embodiments illustrated as examples represent possible variants of the welding method, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of the welding apparatus 1, it and its constituent parts are illustrated to a certain extent out of scale and/or on an enlarged scale and/or on a reduced scale.

The objective underlying the independent inventive solutions may be found in the description.

Above all, the individual embodiments of the subject matter illustrated in FIGS. 1, 2, 3; 4, 5; 6; 7, 8, 9; 10 and 11 constitute independent solutions proposed by the invention in their own right. The objectives and associated solutions proposed by the invention may be found in the detailed descriptions of these drawings.

List of Reference Numbers

| | |
|---|---|
| 1 | Welding apparatus |
| 2 | Power source |
| 3 | Power component |
| 4 | Control device |
| 5 | Control valve |
| 6 | Supply line |
| 7 | Gas |
| 8 | Gas storage |
| 9 | Welding torch |
| 10 | Feeding device |
| 11 | Welding rod |
| 12 | Supply line |
| 13 | Supply reel |
| 14 | Supply line |
| 15 | Arc |
| 16 | Workpiece |
| 17 | Supply line |
| 18 | Cooling system |
| 19 | Cooling circuit |
| 20 | Flow indicator |
| 21 | Coolant container |
| 22 | Input and/or output device |
| 23 | Hose pack |
| 24 | Control line |
| 25 | Drive |
| 26 | Conveyor roller |
| 27 | Conveyor roller |
| 28 | Measuring device |
| 29 | Welding current I(t) |
| 30 | Welding voltage U(t) |
| 31 | Measurement line |
| 32 | Measurement line |
| 33 | Output terminal |
| 34 | Output terminal |
| 35 | Terminal voltage UK(t) |
| 36 | Time interval TI |
| 37 | Frequency H(t) |
| 38 | Minimum frequency Hmin |
| 39 | Maximum frequency Hmax |
| 40 | Instant |
| 41 | Control period TK |
| 42 | Observation period TB |
| 43 | Period duration TP |
| 44 | Resistance R(t) |
| 45 | Minimum resistance Rmin |
| 46 | Maximum resistance Rmax |
| 47 | Instant |
| 48 | Mean resistance RM(t) |
| 49 | Upper resistance difference Reo |
| 50 | Lower resistance difference Reu |
| 51 | Threshold value |
| 52 | Threshold value |
| 53 | Instant |
| 54 | Control period TKA |
| 55 | Observation period TBA |
| 56 | Start interval TS |
| 57 | Starting time |
| 100 | Characteristic variable |
| 101 | First time interval |

-continued

| | |
|---|---|
| 102 | Second time interval |
| 103 | Scanning rate |
| 104 | Upper threshold value |
| 105 | Lower threshold value |
| 106 | First mean value |
| 107 | Second mean value |

The invention claimed is:

1. A Welding method for implementing and monitoring a welding process with a welding rod which melts in an arc which is supplied with power from at least one automatically controlled power source, whereby the power source and a feeding device for the welding rod are controlled by means of a control device, and whereby at least one control variable such as welding current, welding voltage or resistance is measured or calculated from characteristic variables of the arc during the welding process, and different welding parameters or values for the control variable are stored in a memory during the welding process, wherein a first and a second time interval with different durations and a scanning rate are set in order to determine values of the characteristic variable, and the values of the characteristic variable are stored with every scan, after which, at an instant, a first mean value and a second mean value are calculated by the control device as the control variable from stored values of the characteristic variable which lie in at least one of the first or second time intervals lying earlier in time than said instant, and then an upper threshold value and a lower threshold value are calculated from the first mean value of the first time interval and the control variable is compared with said upper threshold value and with said lower threshold value.

2. The welding method as claimed in claim 1, wherein said first or second time intervals are coupled with instantaneous control variable or instantaneous characteristic variable and the time intervals are therefore carried forward with the instantaneous control variable during the welding process so that a quantity of values for said control variable and values of said characteristic variables in said first or second time intervals constantly changes.

3. The welding method as claimed in claim 1, wherein a respective time position of the time interval is selected so that it immediately precedes an at last determined value of the control variable.

4. The welding method as claimed in claim 1, wherein a lower threshold value which does not change over time and an upper threshold value which does not change over time are set for the control variable prior to running the welding process, and a difference between the upper threshold value which varies over time and the lower threshold value which varies over time is smaller than, in particular equal to a fraction of, the difference between the upper threshold value which does not vary over time and the lower threshold value which does not vary over time.

5. The welding method as claimed in claim 4, wherein, for a duration of a start interval TS commencing at a starting time of the welding process, the lower threshold value which does not vary over time and the upper threshold value which does not vary over time are used by the control device to monitor the welding process, after which the lower threshold value which varies over time and upper threshold value which varies over time are used.

6. The welding method as claimed in claim 4, wherein, for a duration of the start interval TS commencing at the starting time, a lower threshold which starts from the lower threshold value which does not vary over time and continuously increases, and an upper threshold which starts from the upper threshold value which does not vary over time and continuously decreases are used to monitor the welding process.

7. The welding method as claimed in claim 4, wherein a threshold for the threshold value is calculated from a data bank or is stored in a data bank.

8. The welding method as claimed in claim 4, wherein a threshold for the threshold value is taken from the last welding operation.

9. The welding method as claimed in claim 1, wherein an instantaneous resistance $R(t)$ or an instantaneous power is calculated from stored characteristic variables of the welding voltage $U(t)$ and welding current $I(t)$ during at least one of said first or second time intervals and the resistance $R(t)$ is used as the control variable.

10. The welding method as claimed in claim 1, wherein a resistance or power is continuously calculated from characteristic variables of the welding voltage and welding current and this is stored as the characteristic variable for at least one of said first or second time intervals and is then averaged during a period of said first or second time intervals.

11. The welding method as claimed in claim 9, wherein the welding process is a pulsed welding process and said instantaneous resistance $R(t)$ or said instantaneous power is calculated by determining a mean value during at least one period duration TP of a periodic voltage curve plotted for said welding voltage $U(t)$ and/or a periodic current curve plotted for said welding current $I(t)$.

12. The welding method as claimed in claim 9, wherein the welding process is a pulsed welding process and an instant is selected from a pulse phase or base phase of a periodic voltage curve or a periodic current curve in order to calculate said resistance $R(t)$.

13. The welding method as claimed in claim 1, wherein, in a case of a periodic voltage curve of a welding voltage $U(t)$ and/or in a case of a periodic current curve of a welding current $I(t)$, a time sequence of period durations TP is defined and said sequence of period durations TP is used as the control variable.

14. The welding method as claimed in claim 1, wherein minimum points are determined in a periodic voltage curve of a welding voltage $U(t)$ and a frequency $H(t)$ of short circuits occurring in the arc during a time interval is calculated from a number of minimum points, and said frequency $H(t)$ is used as the control variable.

15. The welding method as claimed in claim 1, wherein if the upper threshold value is exceeded or if there is a drop below the lower threshold value by the second mean value, a control signal is generated by the control device.

16. The welding method as claimed in claim 15, wherein the welding process is halted and/or a status report of statuses of the welding process such as the rod feeding status, a status of the welding torch or a work piece quality, is generated by the control device as a function of the control signal.

17. The welding method as claimed in claim 15, wherein when there is a rise above or drop below the threshold values by the second mean value for a first time, a counter is started which counts up or counts down for as long as the mean value is above or below the threshold value, and the control signal is then generated when a specific counter status is reached.

18. The welding method as claimed in claim 1, wherein the control signal is generated if the upper threshold value is exceeded or there is a drop below the lower threshold value for a duration of an observation period which is longer than a predefined control period.

19. The welding method as claimed in claim 1, wherein an alarm is triggered by the control signal.

20. The welding method as claimed in claim 1, wherein the feeding device is activated by the control signal in order to change a feed rate Vd of the welding rod.

21. The welding method as claimed in claim 1, wherein a cooling system is activated by the control signal in order to change a cooling power for a welding torch of a welding apparatus.

22. The welding method as claimed in claim 1, wherein when there is a change in operating point, in particular a job change by a user, the control device treats this as a new start of the welding process or ignores the characteristic variables for a defined period.

23. The welding method as claimed in claim 1, wherein, prompted by an external signal, the control device skips subsequent characteristic variables for a predefined period or during a time said external signal is present or until another external signal occurs and these characteristic variables are not used to evaluate the mean values.

24. The welding method as claimed in claim 1, wherein if welding with a robot, the control device monitors robot axes and the control device then calculates whether monitoring of the welding process on a basis of mean values is meaningful and should proceed on this basis.

25. The welding method as claimed in claim 1, wherein the first time interval lasts for a duration of between 0.3 and 1.0 second, in particular 0.5 of a second, and the second time interval lasts for a duration of between 0.05 and 0.3 of a second, in particular 0.1 of a second.

26. The welding method as claimed in claim 1, wherein the upper and lower threshold values are calculated by the control device as a function of other welding parameters set by a user, in particular the material to be welded, a type of welding method used such as a short arc welding method, pulsed welding method or spray arc welding method.

27. The welding method as claimed in claim 26, wherein the threshold values for the first mean value are preferably increased or reduced by the control device by 6% when the welding process is a short arc-welding method, by 2.5% when the welding process is a pulsed welding method and by 2.0% when the welding process is a spray arc welding method.

28. A welding method for implementing and monitoring a welding process with a welding rod which melts in an arc which is supplied with power from at least one automatically controlled power source, and the power source and a feeding device for the welding rod are controlled by means of a control device, and whereby at least one control variable is measured or calculated from characteristic variables of the arc such as welding current, welding voltage or resistance during the welding process, and different welding parameters or values for the control variable are stored in a memory during the welding process, wherein a time interval with a duration and a scanning rate is set in order to determine values of the characteristic variable and the values of the characteristic variable are stored with every scan, after which, at an instant, a mean value is calculated by the control device from stored values of the characteristic variable which lie in the time interval lying earlier in time than said instant and a last measured value of the characteristic variable is used as the control variable, and an upper threshold value and a lower threshold value is calculated from said mean value of the time interval and the control variable is compared with said upper threshold value and with said lower threshold value.

29. The welding method as claimed in claim 28, wherein a number of variances of the control variable from a range between the lower threshold value which varies over time and the upper threshold value which varies over time is determined and this number is used as another control variable.

30. The welding method as claimed in claim 28, wherein a number of variances of the control variable from a range between the lower threshold value which does not vary over time and the upper threshold value which does not vary over time is determined and this number is used as another control variable.

31. A welding method for implementing and monitoring a welding process with a welding rod which melts in an arc, which is supplied with power from at least one automatically controlled power source, and the power source and a feeding device for the welding rod are controlled by means of a control device, and whereby at least one control variable is measured or calculated from characteristic variables of the arc such as welding current, welding voltage or resistance during the welding process and different welding parameters or values for the control variable are stored in a memory during the welding process, wherein a first and a second number of values to be recorded for the characteristic variable and a scanning rate are set for determining values of the characteristic variable, and the second number is smaller than the first number, and the values of the characteristic variable are stored with every scan, after which, at an instant, a first mean value and a second mean value are calculated by the control device as the control variable from stored values of the characteristic variable which lie earlier in time than the instant, and an upper and a lower threshold value are calculated from the first mean value of the first number and the control variable is compared with the upper and with the lower threshold value.

32. A welding method for implementing and monitoring a welding process with a welding rod which melts in an arc, which is supplied with power from at least one automatically controlled power source, and said power source and a feeding device for the welding rod are controlled by means 1 of a control device, and whereby a welding voltage U(t) is measured during the welding process, and different welding parameters and the control variable are stored in a memory during the welding process, wherein minimum points are defined in a periodic voltage curve plotted for the welding voltage U(t), in particular short circuits which occur, and a period duration TP between two consecutive minimum points is calculated, after which if there is a rise above an upper or a drop below a lower threshold value for the period duration TP a control signal is generated by the control device and the welding process is halted and/or a status report of statuses of the welding process, such as a feed status of the rod, a status of the welding torch or the workpiece quality, is generated by the control device as a function of the control signal.

33. The welding method as claimed in claim 32, wherein a number of variances of said period duration TP from a range between the lower threshold value and the upper threshold value is determined and this number is used as another control variable.

34. The welding method as claimed in claim 32, wherein the control signal is generated if the upper threshold value is exceeded or there is drop below the lower threshold value for a duration of an observation period which is longer than a predefined control period.

35. The welding method as claimed in claim 32, wherein an alarm is triggered by the control signal.

36. The welding method as claimed in claim 32, wherein the feeding device is activated by the control signal in order to change a feed rate Vd of the welding rod.

37. The welding method as claimed in claim 32, wherein a cooling system is activated by the control signal in order to change a cooling power for a welding torch of a welding apparatus.

* * * * *